US012679169B2

(12) United States Patent
Yang

(10) Patent No.: US 12,679,169 B2
(45) Date of Patent: Jul. 14, 2026

(54) EXTERNAL CONNECTION DEVICE

(71) Applicant: SHENZHEN ANTOP TECHNOLOGY CO., LTD, Shenzhen (CN)

(72) Inventor: Ruidian Yang, Shenzhen (CN)

(73) Assignee: SHENZHEN ANTOP TECHNOLOGY CO., LTD, Shenzhen (CN)

( * ) Notice: Subject to any disclaimer, the term of this patent is extended or adjusted under 35 U.S.C. 154(b) by 155 days.

(21) Appl. No.: 18/742,485

(22) Filed: Jun. 13, 2024

(65) Prior Publication Data

US 2025/0332882 A1     Oct. 30, 2025

(30) Foreign Application Priority Data

Apr. 30, 2024    (CN) ......................... 202420971097.X

(51) Int. Cl.
| | |
|---|---|
| *B60H 1/00* | (2006.01) |
| *B60H 1/26* | (2006.01) |
| *B60H 3/06* | (2006.01) |
| *H01Q 1/22* | (2006.01) |
| *H01Q 1/32* | (2006.01) |

(52) U.S. Cl.
CPC ..... *B60H 1/00521* (2013.01); *B60H 1/00364* (2013.01); *B60H 1/262* (2013.01); *B60H 3/0641* (2013.01); *H01Q 1/22* (2013.01); *H01Q 1/3275* (2013.01)

(58) Field of Classification Search
CPC .... H01Q 1/22; H01Q 1/3275; B60H 1/00521; B60H 1/00364; B60H 1/262; B60H 3/0064
See application file for complete search history.

(56) References Cited

U.S. PATENT DOCUMENTS

| | | | | |
|---|---|---|---|---|
| 2009/0323272 A1* | 12/2009 | Iijima | ..................... | G06F 1/203 |
| | | | | 361/679.46 |
| 2017/0223868 A1* | 8/2017 | Zheng | ...................... | H01Q 1/42 |
| 2018/0220550 A1* | 8/2018 | Sieber | .................. | F04D 27/001 |
| 2019/0334567 A1* | 10/2019 | Yang | ........................ | H01Q 1/50 |
| 2020/0115996 A1* | 4/2020 | Priser | ........................ | E21B 7/00 |
| 2021/0408676 A1* | 12/2021 | Sainz Fuertes | ........ | H01Q 1/246 |
| 2022/0008601 A1* | 1/2022 | Wang | ................. | B01D 46/2411 |

FOREIGN PATENT DOCUMENTS

| | | |
|---|---|---|
| CN | 208887008 U | 5/2019 |
| CN | 220199006 U | 12/2023 |

* cited by examiner

*Primary Examiner* — Hai V Tran
(74) *Attorney, Agent, or Firm* — Brooks Kushman P.C.

(57) ABSTRACT

An external connection device including a ventilation mechanism and an antenna; the ventilation mechanism includes a housing assembly and a fan arranged inside the housing assembly; wherein the housing assembly is provided with a first through hole and a second through hole, and the fan is connected with a fan cable extending out of the housing assembly from the first through hole; and the antenna is arranged on an outer wall of the housing assembly, and the antenna is connected with the antenna cable, and the antenna cable extends into the housing assembly from the second through hole and extends out of the housing assembly from the first through hole.

12 Claims, 7 Drawing Sheets

11

12

13

200

EXTERNAL CONNECTION DEVICE

CROSS-REFERENCE TO RELATED APPLICATION

The present application claims priority of Chinese patent application, with application No. 202420971097.X, filed on Apr. 30, 2024; the contents of which are incorporated herein by reference.

TECHNICAL FIELD

The present application relates to the technical field of ventilation apparatus, and more specifically to an external connection device.

BACKGROUND

The exterior of a recreational vehicle is generally mounted with an antenna to receive wireless signals from the outside, and a ventilation device to supplement fresh air inside the vehicle. However, the antenna and ventilation device are usually mounted at different positions on the exterior of the recreational vehicle, which affects the overall aesthetics of the recreational vehicle. Moreover, the recreational vehicle is required to provide holes where the antenna and ventilation device are located for the cables of the antenna and ventilation device to enter the vehicle, and the mounting is inconvenient.

SUMMARY

An object of the present application is to provide an external connection device, which aims to solve the technical problem of the antenna and the ventilation device being mounted at different positions outside the vehicle, which affects the overall aesthetics of the recreational vehicle and is inconvenient to mount in existing technologies.

In order to achieve the above object, the technical solution adopted in the present application is to provide an external connection device, which includes: a ventilation mechanism and an antenna;

the ventilation mechanism includes a housing assembly and a fan arranged inside the housing assembly; the housing assembly is provided with a first through hole and a second through hole, and the fan is connected with a fan cable extending out of the housing assembly from the first through hole; and the antenna is arranged on an outer wall of the housing assembly, and the antenna is connected with the antenna cable, and the antenna cable extends into the housing assembly from the second through hole and extends out of the housing assembly from the first through hole.

Further, the housing assembly includes a fan bracket, an outer cover body, and an air inlet pipe; the fan bracket is provided with a mounting port, the fan is arranged inside the mounting port, the first through hole is arranged at the fan bracket, the outer cover body is arranged at the fan bracket, the second through hole is arranged at an outer wall of the outer cover body, the air inlet pipe is arranged between the outer cover body and the fan bracket, an end of the air inlet pipe is connected with the mounting port, and an other end of the air inlet pipe is exposed out of the outer cover body.

Further, the housing assembly further includes an induced draft frame, the induced draft frame is connected to a side of the fan bracket facing away from the air inlet pipe, and an air outlet channel is formed within the induced draft frame, and an end of the air outlet channel corresponds to the mounting port.

Further, the induced draft frame includes an extension portion and a circular clamping portion; the air outlet channel is formed within the extension portion, an end of the extension portion is connected to the fan bracket, the circular clamping portion is connected to an other end of the extension portion, and the circular clamping portion is arranged around a periphery of the extension portion, and an assembly gap is formed between the circular clamping portion and the fan bracket.

Further, the housing assembly is provided with an air inlet and an air outlet; the ventilation mechanism further includes a first stage filtering unit and a second stage filtering unit, the first stage filtering unit is arranged inside the air inlet, and the second stage filtering unit is arranged inside the air outlet.

Further, the ventilation mechanism further includes an air outlet grille, the air outlet grille is detachably covered onto the air outlet, and the second stage filtering unit is placed on the air outlet grille.

Further, a wall surface of the air outlet is provided with a circular baffle, and an edge of the second stage filtering unit is sandwiched between the circular baffle and the air outlet grille.

Further, a top of the housing assembly is provided with a positioning groove, and the antenna is at least partially mounted in the positioning groove.

Further, one of a top of the housing assembly and a bottom of the antenna is provided with a plurality of fixing columns, another one of the top of the housing assembly and the bottom of the antenna is provided with a plurality of fixing holes, and the plurality of fixing columns are inserted in the plurality of fixing holes in one-to-one correspondence.

Further, one of the top of the housing assembly and the bottom of the antenna is provided with a circular protrusion, another one of the top of the housing assembly and the bottom of the antenna is provided with a circular groove, the circular protrusion is inserted into the circular groove, at least parts of the plurality of fixing columns are arranged at the circular protrusion, and at least parts of the plurality of fixing holes are arranged at a bottom of the circular groove.

Compared with existing technology, the beneficial effect of the external connection device provided in the present application is that the antenna is mounted on the outer wall of the housing assembly of the ventilation mechanism, the antenna can be mounted as a whole on the roof panel of the recreational vehicle with the ventilation mechanism, so that the roof panel of the recreational vehicle is clean and tidy, and the overall aesthetics of the recreational vehicle is improved. In addition, the antenna cable extends into the housing assembly from the second through hole, and then extends out of the housing assembly together with the fan cable from the first through hole. Therefore, only a hole needs to be provided in the part of the roof panel corresponding to the first through hole, and the fan cable and antenna cable can be introduced into the vehicle at the same time, the mounting is very convenient.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

Figure 1:
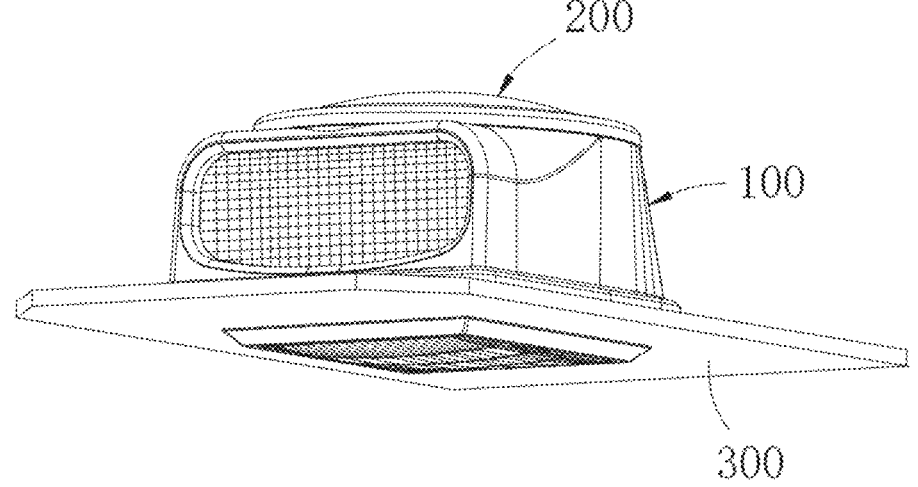
FIG. 1 is a structural schematic diagram of an external connection device provided in an embodiment of the present application.

In the drawings, the reference signs are listed:

100—ventilation mechanism;

10—housing assembly; 11—fan bracket; 111—first through-hole; 112—mounting port; 113—bottom plate; 114—boss; 115—first plug-in structure; 116—line protrusion; 117—third plug-in structure; 118—mounting groove; 119—connection column; 1191—second connection hole; 12—outer cover body; 121—second through hole; 122—positioning groove; 123—fixing column; 124—circular protrusion; 125—first docking identification; 126—fourth plug-in structure; 127—limitation column; 13—air inlet pipe; 131—air inlet; 132—second plug-in structure; 133—first baffle; 134—second baffle; 135—inclined surface; 136—draining hole; 14—induced draft frame; 141—air outlet; 142—buckle; 143—circular baffle; 144—air outlet channel; 145—extension portion; 146—circular clamping portion; 147—first connection hole; 20—fan; 30—first stage filtering unit; 40—second stage filtering unit; 50—air outlet grille; 51—slot; 60—threaded fastener; 200—antenna; 201—fixing hole; 202—circular groove; 203—second docking identification; 204—bottom cover; 205—top cover; 206—signal receiving component; 2061—first antenna oscillator; 2062—second antenna oscillator; 2063—circuit board; 207—third through hole; 208—fifth plug-in structure; 209—sixth plug-in structure; and

300—roof panel.

DETAILED DESCRIPTION OF EMBODIMENTS

Herein, embodiments of the present application are described in detail, and examples of the embodiment are illustrated in the accompanying figures; an always unchanged reference number or similar reference numbers represent(s) identical or similar components or components having identical or similar functionalities. The embodiment described below with reference to the accompanying figures is illustrative and intended to illustrate the present application, but should not be considered as any limitation to the present application.

In the description of the present application, it needs to be understood that, directions or location relationships indicated by terms such as "length", "width", "up", "down", "front", "rear", "left", "right", "vertical", "horizontal", "top", "bottom", "inside", "outside", and so on are the directions or location relationships shown in the accompanying figures, which are only intended to describe the present application conveniently and simplify the description, but not to indicate or imply that an indicated device or component must have specific locations or be constructed and manipulated according to specific locations; therefore, these terms shouldn't be considered as any limitation to the present application.

In addition, terms "the first" and "the second" are only used in describe purposes, and should not be considered as indicating or implying any relative importance, or impliedly indicating the number of indicated technical features. As such, technical feature(s) restricted by "the first" or "the second" can explicitly or impliedly comprise one or more such technical feature(s). In the description of the present application, "a plurality of" means two or more, unless there is additional explicit and specific limitation.

In the present application, unless there is additional explicit stipulation and limitation, terms such as "mount", "connect with each other", "connect", "fix", and so on should be generalizedly interpreted, for example, "connect" can be interpreted as being fixedly connected, detachably connected, or connected integrally; "connect" can also be interpreted as being mechanically connected or electrically connected; "connect" can be further interpreted as being directly connected or indirectly connected through intermediary, or being internal communication between two components or an interaction relationship between the two components. For the one of ordinary skill in the art, the specific meanings of the aforementioned terms in the present application can be interpreted according to specific conditions.

Figure 2:
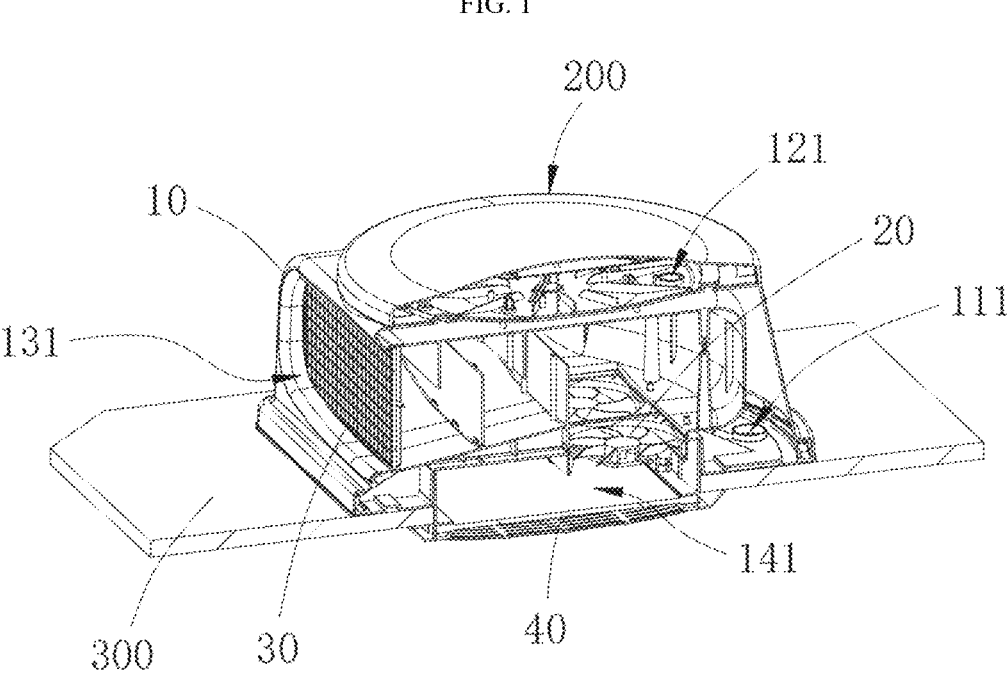
FIG. 2 is a sectional view of an external connection device shown in FIG. 1.

As shown in FIGS. 1 and 2, an embodiment of present application provides an external connection device, which includes a ventilation mechanism 100 and an antenna 200. The ventilation mechanism 100 includes a housing assembly 10 and a fan 20 arranged within the housing assembly 10. The housing assembly 10 is provided with a first through hole 111 and a second through hole 121, and the fan 20 is connected to a fan cable (not shown). The fan cable extends out of the housing assembly 10 from the first through hole 111, and the antenna 200 is arranged on the outer wall of the housing assembly 10. The antenna 200 is connected to an antenna cable (not shown), and the antenna cable extends into the housing assembly 10 from the second through hole 121, and then extends out of the housing assembly 10 from the first through hole 111.

The external connection device provided in the embodiment of the present application can be applied to vehicles such as recreational vehicles (RV), as well as to buildings, which is not limited herein. When the external connection device is applied to the RV, the antenna 200 is mounted onto the outer wall of the housing assembly 10 of the ventilation mechanism 100, and the antenna 200 can be mounted as a whole with the ventilation mechanism 100 on the roof panel of the RV, so that the roof panel of the RV is clean and tidy, and the overall aesthetics of the RV is improved. In addition, the antenna cable extends into the housing assembly 10 from the second through hole 121, and then extends out of the housing assembly 10 together with the fan cable from the first through hole 111. Therefore, only a hole needs to be provided in the corresponding part of the first through hole 111 on the roof panel, and the fan cable and antenna cable can be introduced into the vehicle at the same time, and the installation is very convenient. The fan 20 is used to draw fresh air from the outside into the RV to improve the air quality inside the vehicle, and the fan 20 is connected to the power system inside the vehicle through fan cables and powered by the power system. The antenna 200 is used to receive external wireless signals and transmit the external wireless signals to interior devices such as televisions, radios, telephones, etc. through antenna cables.

Specifically, as shown in FIG. 2, the housing assembly 10 is provided with an air inlet 131 and an air outlet 141. The position of the roof panel corresponding to the air outlet 141 is required to be perforated. When the fan 20 starts, external air enters the housing assembly 10 from the air inlet 131, and then being discharged out of the housing assembly 10 from the air outlet 141, and then enters the vehicle. The air inlet 131 can be arranged towards the front of the RV. When the RV is parked, the external air is sucked into the vehicle by starting the fan 20. However, when the RV is in motion, there is no need to start the fan 20, and the external air can be automatically sucked into the vehicle from the air inlet 131.

In an embodiment, as shown in FIG. 2, the ventilation mechanism 100 further includes a first stage filtering unit 30 and a second stage filtering unit 40. The first stage filtering unit 30 is provided inside the air inlet 131, and the second stage filtering unit 40 is provided inside the air outlet 141. By arranging the first stage filtering unit 30 inside the air inlet 131 and the second stage filtering unit 40 inside the air outlet 141, the external air can be filtered and purified twice to ensure that the air entering the vehicle is clean and hygienic. Specifically, both the first stage filtering unit 30 and the second stage filtering unit 40 are porous structures. The first stage filtering unit 30 is mainly used to filter larger particles in the air, while the pores of the second stage filtering unit 40 are smaller than those of the first stage filtering unit 30 and is mainly used to filter smaller particles in the air.

Figure 4:
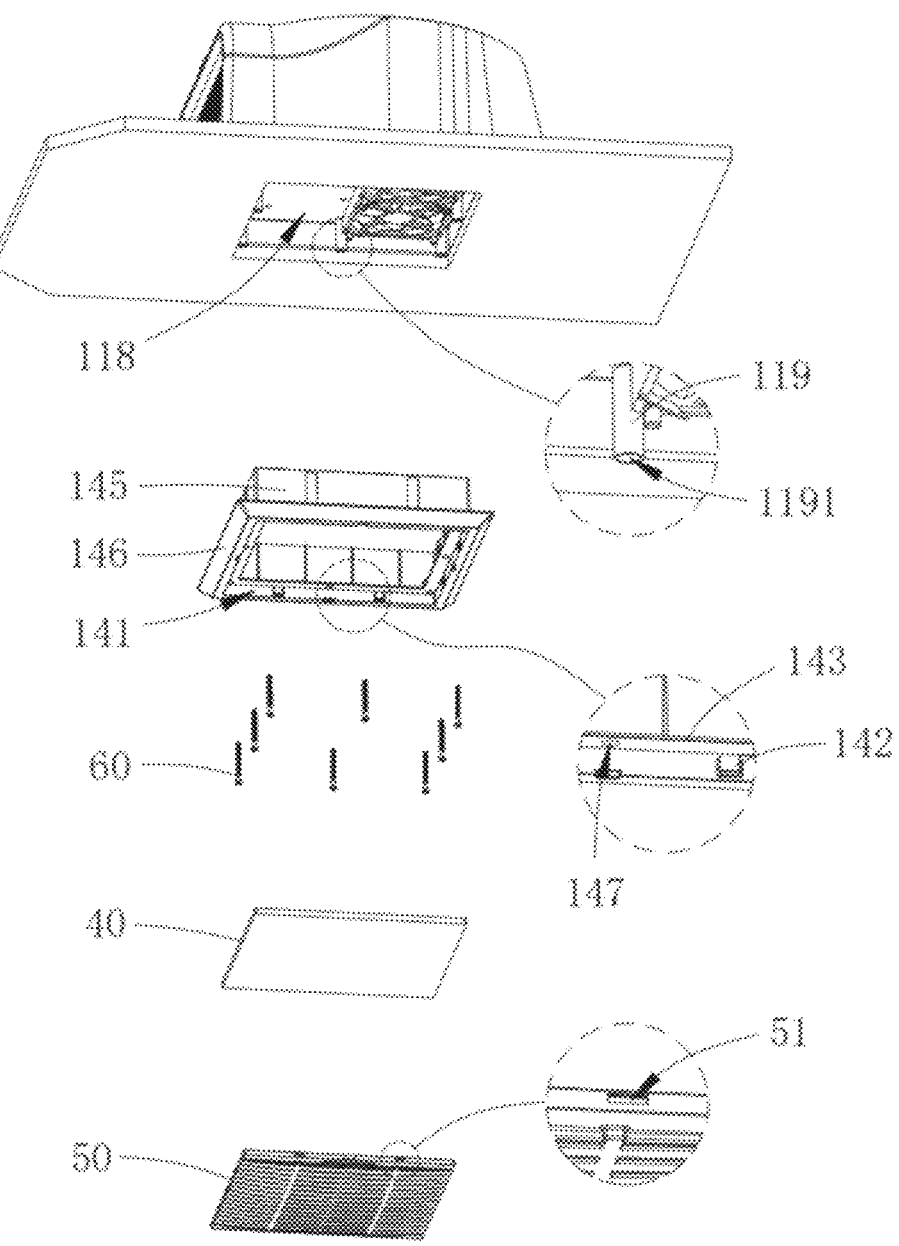
FIG. 4 is a second explosive structural diagram of an external connection device shown in FIG. 1.

In an embodiment, as shown in FIG. 4, the ventilation mechanism 100 further includes an air outlet grille 50, which is detachably covered onto the air outlet 141, and a second stage filtering unit 40 is placed on the air outlet grille 50. The detachable of the air outlet grille 50 facilitates the replacement of the second stage filtering unit 40. Specifically, the housing assembly 10 includes an external housing and an internal housing, the external housing is used to be mounted on the outside of the object, and the internal housing is used to be mounted on the inside of the object. When the housing assembly 10 is applied to a RV, the external housing is used to be mounted on the outside of the RV, and the internal housing is used to be mounted on the inside of the RV. The air inlet 131 is formed on the external housing, and the air outlet 141 is formed on the internal housing. The users can replace the second stage filtering unit 40 in the vehicle, which is very convenient to operate.

In an embodiment, as shown in FIG. 4, a buckle 142 is provided on the wall surface of the air outlet 141, and a slot 51 is provided on the peripheral portion of the air outlet grille 50. The buckle 142 is clamped inside the slot 51. The detachable connection between the air outlet grille 50 and the housing assembly 10 is achieved through the combination of the buckle 142 and the slot 51, which is very convenient for disassembly and assembly.

In an embodiment, as shown in FIG. 4, a circular baffle 143 is further provided on the wall surface of the air outlet 141, and the edge of the second stage filtering unit 40 is sandwiched between the circular baffle 143 and the air outlet grille 50. By arranging the circular baffle 143 on the wall surface of the air outlet 141, the edge of the second stage filtering unit 40 is sandwiched between the circular baffle 143 and the air outlet grille 50, thereby the fixation of the second stage filtering unit 40 is achieved. The air sequentially passes through the inner hole formed by the circular baffle 143, the second stage filtering unit 40, and the air outlet grille 50 before entering the vehicle.

Figure 3:
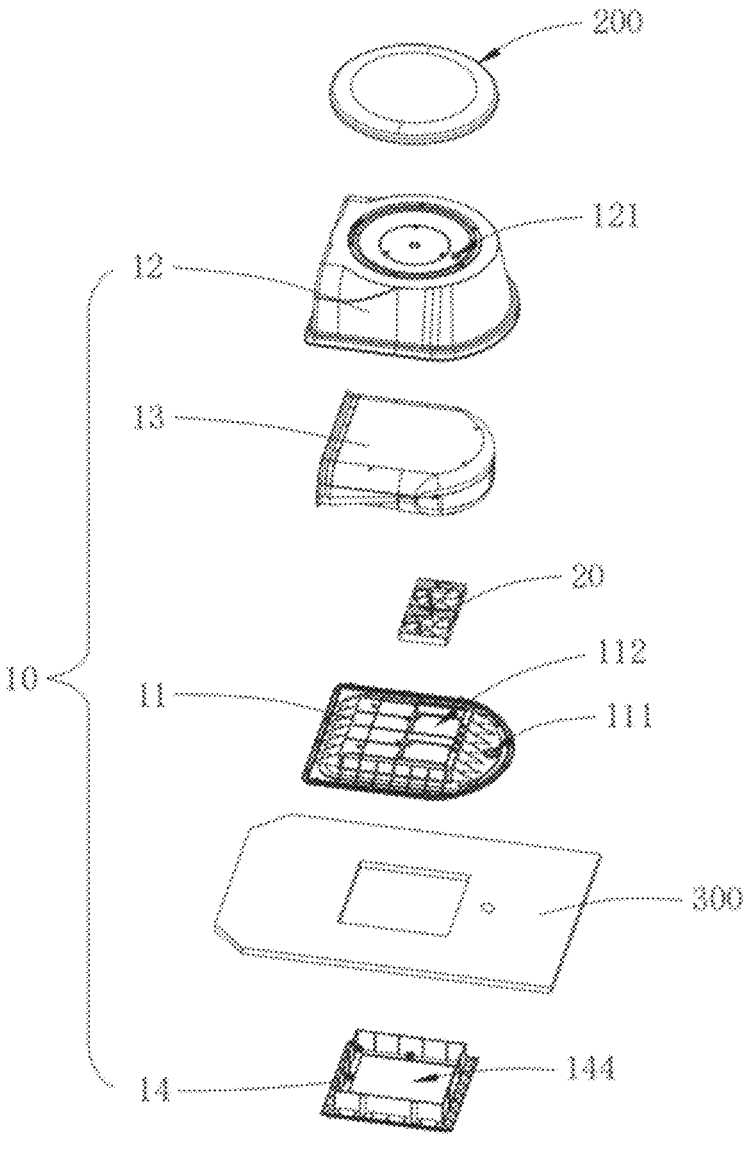
FIG. 3 is a first explosive structural diagram of an external connection device shown in FIG. 1.
Figure 6:
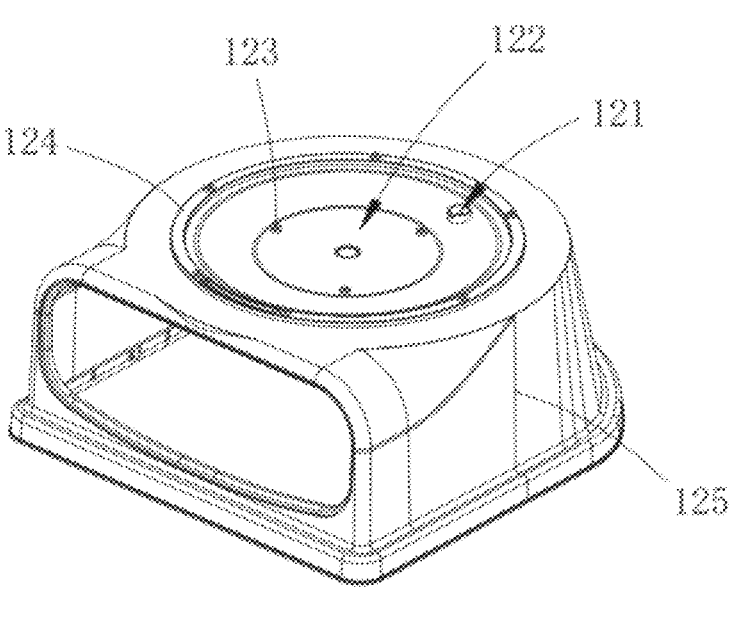
FIG. 6 is a first structural schematic diagram of an outer cover body of an external connection device shown in FIG. 3.

In an embodiment, as shown in FIGS. 3 and 6, the top of the housing assembly 10 is provided with a positioning groove 122, and the antenna 200 is at least partially mounted inside the positioning groove 122. By arranging the positioning groove 122 in the housing assembly 10, it is possible to facilitate the rapid positioning of the antenna 200 and improve assembly efficiency. In addition, the positioning groove 122 is arranged at the top of the housing assembly 10, that is, the antenna 200 is mounted at the top of the housing assembly 10 to facilitate the antenna 200 to receive external wireless signals.

Figure 10:
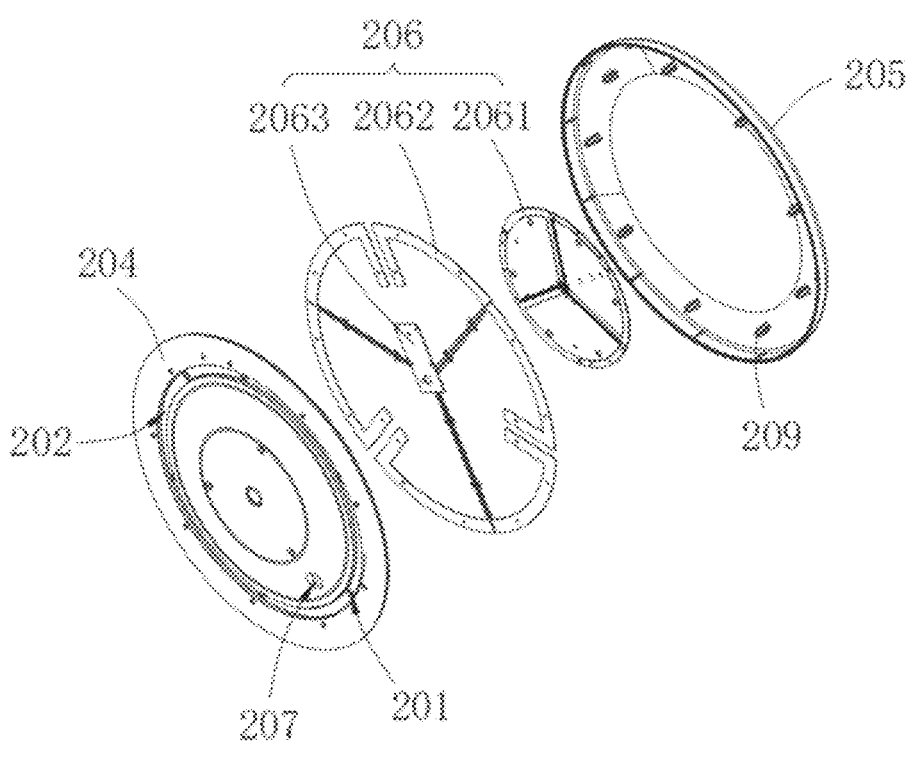
FIG. 10 is a first explosive structural diagram of an antenna of an external connection device shown in FIG. 3.

In an embodiment, as shown in FIGS. 3, 6 and 10, the top of the housing assembly 10 is provided with a plurality of fixing columns 123, and the bottom of the antenna 200 is provided with a plurality of fixing holes 201. The plurality of fixing columns 123 are correspondingly inserted into the plurality of fixing holes 201. By inserting the fixing columns 123 into the fixing holes 201, the housing assembly 10 can be fixed to the antenna 200, which can improve assembly efficiency. The numbers of the fixing columns 123 and the fixing holes 201 are both multiple, which can ensure that the antenna 200 is reliably fixed on the housing assembly 10 without easy shaking. In some other embodiments, the fixing columns 123 can also be arranged at the bottom of the antenna 200 in reverse, and the fixing holes 201 can be arranged at the top of the housing assembly 10 in reverse. In other embodiments, the antenna 200 can be fixed to the top of housing assembly 10 by screws.

In an embodiment, as shown in FIGS. 3, 6, and 10, the top of the housing assembly 10 is provided with a circular protrusion 124, and the bottom of the antenna 200 is provided with a circular groove 202. The circular protrusion 124 is inserted into the circular groove 202, at least parts of the fixing columns 123 are arranged on the circular protrusion 124, and at least parts of the fixing holes 201 are arranged at the bottom of the circular groove 202. During mounting, the antenna 200 is placed at the top of the housing assembly 10, so that the circular protrusion 124 is inserted into the circular groove 202. At this time, the fixing column 123 on the circular protrusion 124 is not aligned with the fixing hole 201 at the bottom of the circular groove 202. By matching the circular protrusion 124 with the circular groove 202, the antenna 200 can rotate relative to the housing assembly 10, and the angle of the antenna 200 can be adjusted to align the plurality of fixing columns 123 with the plurality of fixing holes 201 one by one, therefore, the mounting is very convenient. Specifically, the circular protrusion 124 is arranged around the periphery of the positioning groove 122, and parts of the fixing columns 123 are arranged on the circular protrusion 124 and the other parts of the fixing columns 123 are arranged inside the positioning groove 122. The central protrusion at the bottom of the antenna 200 forms a protrusion, the protrusion is adapted to the shape of the positioning groove 122. The circular groove 202 is arranged around the periphery of the protrusion, and parts of the fixing holes 201 are arranged at the bottom of the circular groove 202 and the other parts of the fixing holes 201 are arranged at the protrusion. In some other embodiments, the circular protrusion 124 can also be arranged at the bottom of the antenna 200 in reverse, and the circular groove 202 can be arranged at the top of the housing assembly 10 in reverse.

Figure 11:
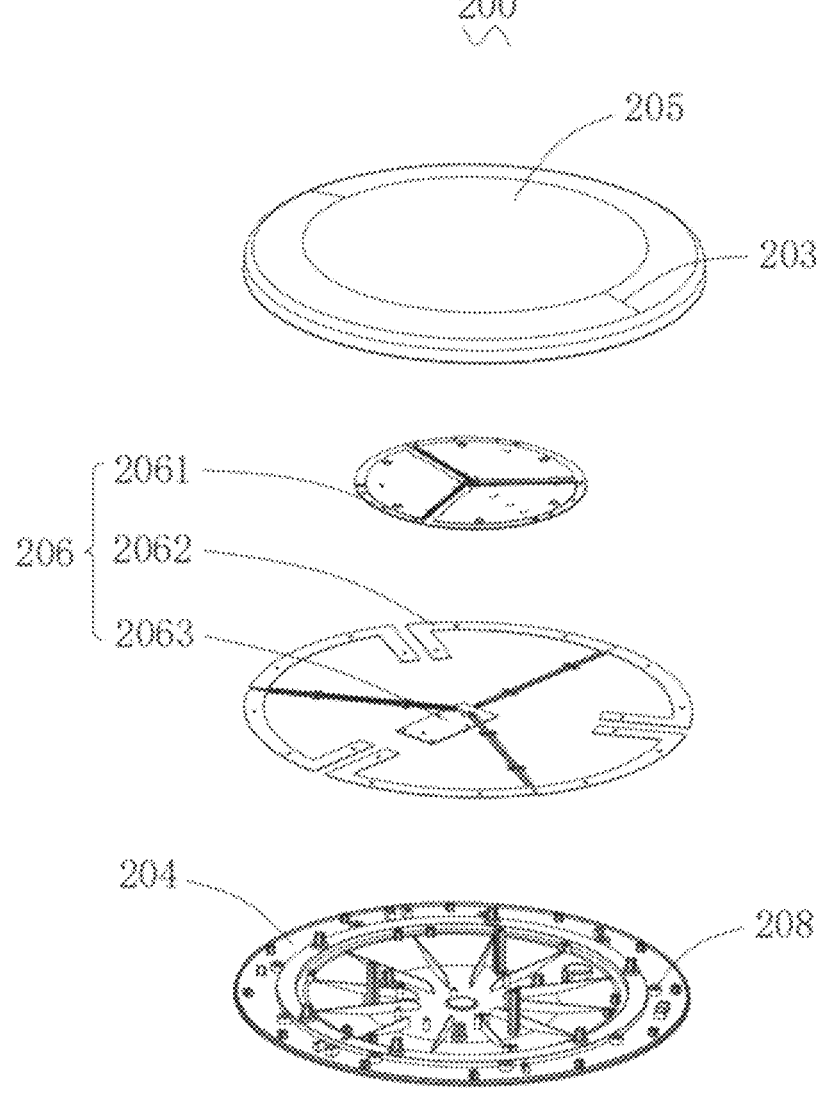
FIG. 11 is a second explosive structural diagram of an antenna of an external connection device shown in FIG. 3.

In an embodiment, as shown in FIGS. 3, 6, and 11, the outer surface of the housing assembly 10 is provided with a first docking identification 125, and the outer surface of the antenna 200 is provided with a second docking identification 203. When the first docking identification 125 is aligned with the second docking identification 203, the plurality of fixing holes 201 are aligned with the plurality of fixing columns 123 one by one. During mounting, the antenna 200 is placed at the top of the housing assembly 10, so that the circular protrusion 124 is inserted into the circular groove 202; the positions of the first docking identification 125 and the second docking identification 203 are observed, and the antenna 200 is rotated until the first docking identification 125 and the second docking identification 203 are aligned. At this time, the antenna 200 is pressed firmly to insert the fixing columns 123 into the fixing holes 201, the fixation of the antenna 200 and the housing assembly 10 is achieved, and the mounting is very convenient.

In an embodiment, as shown in FIGS. 2 and 3, the housing assembly 10 includes a fan bracket 11, an outer cover body 12, and an air inlet pipe 13. The fan bracket 11 is provided with a mounting port 112, and the fan 20 is arranged within the mounting port 112. The first through hole 111 is provided on the fan bracket 11, the outer cover body 12 is provided on the fan bracket 11, the second through hole 121 is provided on the outer cover body 12, the antenna 200 is provided on the outer wall of the outer cover body 12, and the air inlet pipe 13 is provided between the outer cover body 12 and the fan bracket 11, an end of the air inlet pipe 13 is connected to the mounting port 112, and the other end of the air inlet pipe 13 is exposed out of the outer cover body 12. Taking the application of an external connection device on a RV as an example, during mounting the external connection device, the fan bracket 11 is mounted on the roof panel of the RV. The antenna cable enters the space between the inner wall of the outer cover 12 and the outer wall of the air inlet pipe 13 through the second through hole 121, and then passes through the first through hole 111 together with the fan cable to enter the vehicle. The end of the air inlet pipe 13 exposed from the outer cover body 12 forms the air inlet 131. During operation, the fan 20 starts and sucks external air into the air inlet pipe 13. It should be noted that holes need to be provided in the position where the roof panel corresponds to the fan 20, so that air can enter the vehicle after passing through the fan 20. By arranging the antenna cable outside the air inlet pipe 13, on the one hand, the antenna cable can be prevented from obstructing the air inlet, ensuring smooth air inlet, and on the other hand, the antenna cable can be prevented from swinging due to wind, thereby the noise generation is avoided and the stable connection between the antenna cable and antenna 200 is ensured without easy loosening.

Figure 5:
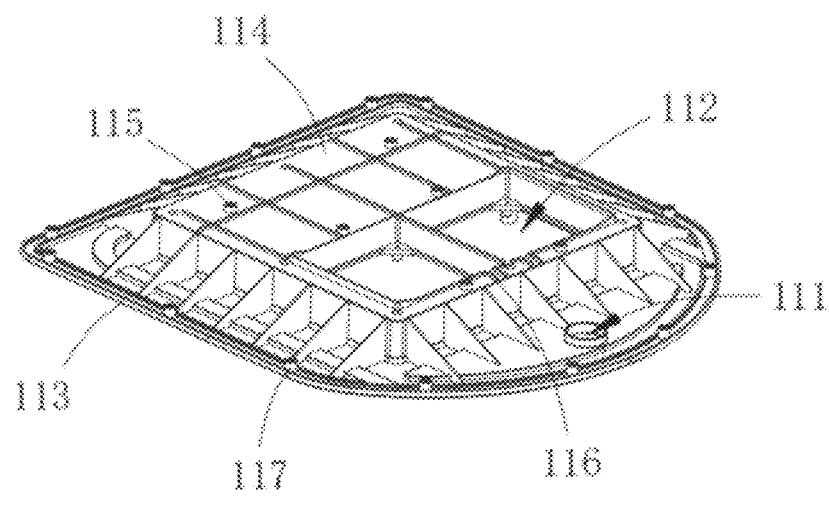
FIG. 5 is a structural schematic diagram of a fan bracket of an external connection device shown in FIG. 3.

In an embodiment, as shown in FIGS. 3 and 5, the fan bracket 11 includes a bottom plate 113 and a boss 114. The boss 114 is located in the middle of one side of the bottom plate 113, and the other side of the bottom plate 113 is used to connect with the outer surface of the roof panel. The mounting port 112 is arranged on the boss 114 and penetrating through the bottom plate 113. The air inlet pipe 13 is arranged on the boss 114, the first through hole 111 is provided on the bottom plate 113, and the outer cover body 12 is connected to the edge of the bottom plate 113.

In an embodiment, as shown in FIG. 5, two mounting ports 112 are provided, and the number of fans 20 corresponds to two. The two fans 20 are respectively mounted in the two mounting ports 112. In other embodiments, the number of mounting ports 112 and fans 20 can also be one, three, four, or more, which is not limited herein.

Figure 8:
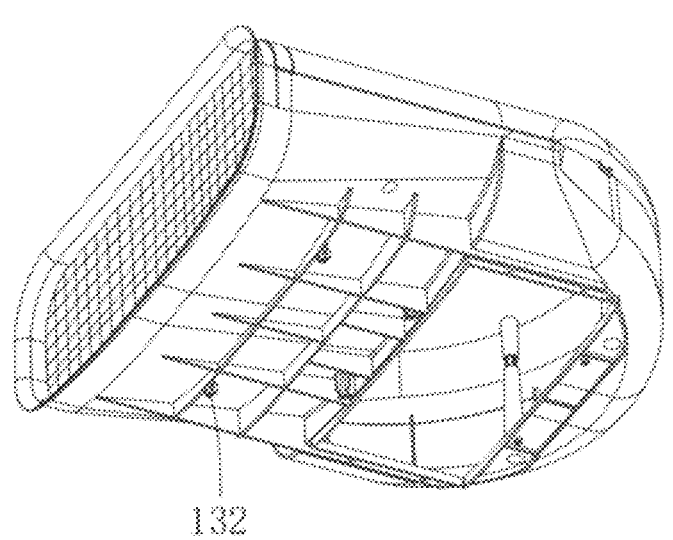
FIG. 8 is a structural schematic diagram of an air inlet pipe of an external connection device shown in FIG. 3.

In an embodiment, as shown in FIGS. 5 and 8, a plurality of first plug-in structures 115 are arranged on the boss 114, and a plurality of second plug-in structures 132 are arranged at the bottom of the air inlet pipe 13. The plurality of second plug-in structures 132 are inserted with the plurality of first plug-in structures 115 one by one, thereby the fixation of the boss 114 and the air inlet pipe 13 is achieved. In other embodiments, the boss 114 and the are inlet pipe 13 can be fixed by screws.

In an embodiment, as shown in FIG. 5, the boss 114 is provided with a line component, and the line component includes two line protrusions 116 arranged opposite to each other at intervals, the fan cable passes through the gap between the two line protrusions 116 and then passes through the first cable hole 111 of the bottom plate 113. Specifically, two sets of line components are provided, each of which is mounted corresponding to one of the two mounting ports 112. The fan cables of two fans 20 pass through the two line components and converge at the first through hole 111.

Figure 7:
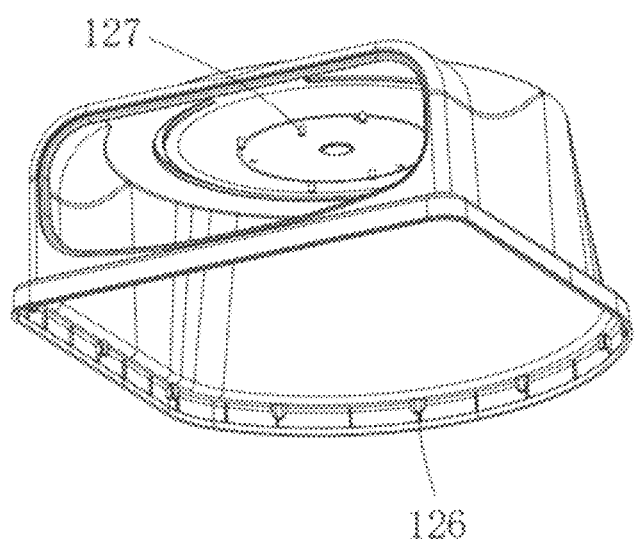
FIG. 7 is a second structural schematic diagram of an outer cover body of an external connection device shown in FIG. 3.

In an embodiment, as shown in FIGS. 5 and 7, the edge of the bottom plate 113 is provided with a plurality of third plug-in structures 117, and the outer cover body 12 is provided with a plurality of fourth plug-in structures 126. The plurality of fourth plug-in structures 126 correspond with the plurality of third plug-in structures 117 to achieve the fixation of the bottom plate 113 and the outer cover body 12. In other embodiments, the bottom plate 113 and the outer cover body 12 can be fixed by screws.

In an embodiment, as shown in FIG. 7, a limitation column 127 is arranged on one side of the air inlet pipe 13 facing the top of the outer cover body 12. The end of the limitation column 127 that is far away from the outer cover body 12 is in contact with the top of the air inlet pipe 13, thereby enhancing the fixing effect on the air inlet pipe 13. Specifically, the top of the outer cover body 12 is inwardly recessed to form a positioning groove 122 on the outside of the outer cover body 12, and the limitation column 127 is arranged corresponding to the position of the positioning groove 122, which can enhance the support for the antenna 200 inside the positioning groove 122. The fixing column 123 and the circular protrusion 124 are both arranged at the top of the outer cover body 12.

Figure 9:
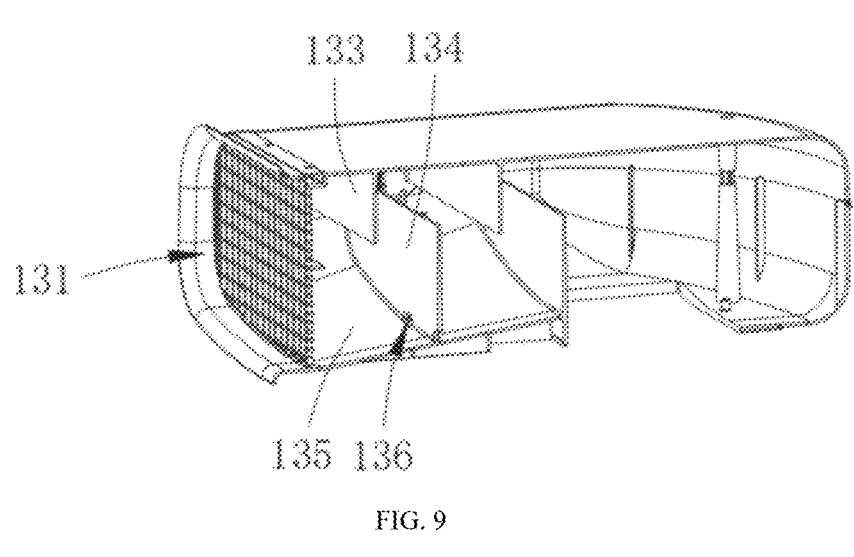
FIG. 9 is a sectional view of an air inlet pipe of an external connection device shown in FIG. 3.

In an embodiment, as shown in FIG. 9, a plurality of first baffles 133 and a plurality of second baffles 134 are arranged inside the air inlet pipe 13. The first baffles 133 are located at the top of the air inlet pipe 13, the first baffles 133 are separated from the bottom of the air inlet pipe 13, the second baffles 134 are located at the bottom of the air inlet pipe 13, and the second baffles 134 are separated from the top of the air inlet pipe 13. The first baffles 133 and the second baffles 134 are alternately arranged along the length direction of the air inlet pipe 13. The first baffles 133 and the second baffles 134 cooperate with each other to form a curved air inlet channel between the air inlet 131 and the fan 20. When air passes through the air inlet channel, the first baffles 133 and the second baffles 134 can block some impurities in the air and enhance the purification effect on the air.

In an embodiment, as shown in FIG. 9, the bottom of the air inlet pipe 13 is provided with an inclined surface 135, which gradually increases in height away from the air inlet 131. The second baffle 134 is arranged on the inclined surface 135, and draining holes 136 are provided in the plurality of second baffles 134 except for the second baffle 134 closest to the fan 20. The draining holes 136 are located at the bottom of the second baffles 134. By arranging the inclined surface 135 at the bottom of the air inlet pipe 13, rainwater entering the air inlet pipe 13 can flow along the inclined surface 135 towards the direction adjacent to the air inlet 131 under the influence of gravity, and be discharged outside the ventilation pipe. The draining holes 136 are provided in the plurality of second baffles 134 except for the second baffle 134 closest to the fan 20, so as to block rainwater flow towards the fan 20 and ensure the normal operation of the fan 20.

In an embodiment, as shown in FIGS. 2 and 3, the housing assembly 10 further includes an induced draft frame 14, the induced draft frame 14 is connected to a side of the fan bracket 11 facing away from the air inlet pipe 13. An air outlet channel 144 is formed inside the induced draft frame 14, and an end of the air outlet channel 144 is arranged corresponding to the mounting port 112, and an end of the air outlet channel 144 away from the induced draft frame 14 forms the air outlet 141. When the fan 20 is started, the external air enters the air inlet pipe 13 from the air inlet 131, then flows along the air inlet pipe 13 to a side of the fan 20, and the external air exits from the other side of the fan 20 and enters the air outlet channel 144 of the induced draft frame 14, and the external air finally flows out of the air outlet 141 and enters the vehicle. Specifically, the induced draft frame 14 extends through the roof panel to the interior of the vehicle, thereby the air outlet 141 is formed inside the vehicle.

In one embodiment, as shown in FIG. 4, the induced draft frame 14 includes an extension portion 145 and a circular clamping portion 146. The air outlet channel 144 is formed within the extension portion 145, and an end of the extension portion 145 is connected to the fan bracket 11. The circular clamping portion 146 is connected to the other end of the extension portion 145 and is arranged around the periphery of the extension portion 145; and an assembly gap is formed between the circular clamping portion 146 and the fan bracket 11. When the external device is applied to the RV, the assembly gap formed between the circular clamping portion 146 and the fan bracket 11 is equal to the thickness of the roof panel. The fan bracket 11 is mounted on the outer side of the roof panel, the circular clamping portion 146 is mounted on the inner side of the roof panel, and the extension portion 145 penetrates the hole arranged on the roof panel to connect the circular clamping portion 146 and the fan bracket 11, therefore the mounting and fixation of the ventilation mechanism 100 on the roof panel is achieved. In addition, the circular clamping portion 146 can also cover the gap between the extension portion 145 and the hole wall of the roof panel to improve aesthetics. Specifically, both the circular baffle 143 and the buckle 142 are located within the extension portion 145.

In one embodiment, as shown in FIG. 4, the circular baffle 143 is provided with a first connection hole 147, and a side of the fan bracket 11 facing away from the air inlet pipe 13 is provided with a mounting groove 118. The bottom of the mounting groove 118 is provided with a connection column 119, the connection column 119 is provided with a second connection hole 1191, an end of the extension portion 145 is inserted into the mounting groove 118, and the first connection hole 147 corresponds to the second connection hole 1191. The ventilation mechanism 100 also includes a threaded fastener 60, the threaded fastener 60 passes through the first connection hole 147 and is threaded to the second connection hole 1191, therefore, the fixation of the induced draft frame 14 and the fan bracket 11 is achieved. Specifically, a plurality of first connection holes 147 are provided, and the plurality of first connection holes 147 are distributed at intervals along the periphery of the circular baffle 143. The number of connection columns 119 is the same as the number of first connection holes 147, and a plurality of second connection holes 1191 correspond one-to-one with the plurality of first connection holes 147. The number of threaded fasteners 60 is the same as the number of first connection holes 147, and the plurality of threaded fasteners 60 pass through the plurality of first connection holes 147 and are respectively threaded to the plurality of second connection holes 1191.

In an embodiment, as shown in FIG. 10, the antenna 200 includes a bottom cover 204, a top cover 205, and a signal receiving component 206. The bottom cover 204 is covered with the top cover 205, and the signal receiving component 206 is arranged between the bottom cover 204 and the top cover 205. The bottom cover 204 is provided with a third through hole 207, and the third through hole 207 corresponds to the second through hole 121. The signal receiving component 206 is connected to the antenna cable, and the antenna cable passes through the third through hole 207. When the external connection device is applied to the RV, the antenna cable sequentially passes through the third through hole 207, the second through hole 121, the first through hole 111, and the hole on the roof panel before entering the vehicle. The signal receiving component 206 is used to receive external wireless signals and transmit the external wireless signals to the interior equipment through the antenna cable. Specifically, both the fixing hole 201 and the circular groove 202 are provided on the bottom cover 204. Specifically, the signal receiving component 206 includes a first antenna oscillator 2061, a second antenna oscillator 2062, and a circuit board 2063. The first antenna oscillator 2061 and the second antenna oscillator 2062 are electrically connected to the circuit board 2063. The first antenna oscillator 2061 and the second antenna oscillator 2062 are able to receive external wireless signals and transmit the wireless signals to the circuit board 2063, and then transmit the wireless signals to the interior equipment through the antenna cable.

In an embodiment, as shown in FIGS. 10 and 11, a plurality of fifth plug-in structures 208 are provided on the bottom cover 204, and a plurality of sixth plug-in structures 209 are provided on the top cover 205. The plurality of fifth plug-in structures 208 are correspondingly connected to the plurality of sixth plug-in structures 209, therefore the fixation between the bottom cover 204 and the top cover 205 is achieved. In another embodiment, the bottom cover 204 and the top cover 205 can be fixed by screws.

The above are only preferred embodiments of the present application and are not intended to limit the present application. Any modifications, equivalent substitutions, and improvements made within the spirit and principles of the present application shall be included within the scope of protection of the present application.

What is claimed is:

1. An external connection device, comprising:

a ventilation mechanism, comprising a housing assembly and a fan arranged inside the housing assembly; wherein the housing assembly is provided with a first through hole and a second through hole, and the fan is connected with a fan cable extending out of the housing assembly from the first through hole; and an antenna, arranged on an outer wall of the housing assembly, wherein the antenna is connected with an antenna cable, and the antenna cable extends into the housing assembly from the second through hole and extends out of the housing assembly from the first through hole;

wherein the housing assembly comprises a fan bracket, an outer cover body, and an air inlet pipe; the fan bracket is provided with a mounting port, the fan is arranged inside the mounting port, the first through hole is arranged at the fan bracket, the outer cover body is arranged at the fan bracket, the second through hole is arranged at an outer wall of the outer cover body, the air inlet pipe is arranged between the outer cover body and the fan bracket, an end of the air inlet pipe is connected with the mounting port, and another end of the air inlet pipe is exposed out of the outer cover body.

2. The external connection device according to claim 1, wherein the housing assembly further comprises an induced draft frame, the induced draft frame is connected to a side of the fan bracket facing away from the air inlet pipe, an air outlet channel is formed within the induced draft frame, and an end of the air outlet channel corresponds to the mounting port.

3. The external connection device according to claim 2, wherein the induced draft frame comprises an extension portion and a circular clamping portion; the air outlet channel is formed within the extension portion, an end of the extension portion is connected to the fan bracket, the circular clamping portion is connected to an other end of the extension portion, and the circular clamping portion is arranged around a periphery of the extension portion, and an assembly gap is formed between the circular clamping portion and the fan bracket.

4. The external connection device according to claim 1, wherein the housing assembly is provided with an air inlet and an air outlet; the ventilation mechanism further comprises a first stage filtering unit and a second stage filtering unit, the first stage filtering unit is arranged inside the air inlet, and the second stage filtering unit is arranged inside the air outlet.

5. The external connection device according to claim 4, wherein the ventilation mechanism further comprises an air outlet grille, the air outlet grille is detachably covered onto the air outlet, and the second stage filtering unit is placed on the air outlet grille.

6. The external connection device according to claim 5, wherein a wall surface of the air outlet is provided with a circular baffle, and an edge of the second stage filtering unit is sandwiched between the circular baffle and the air outlet grille.

7. The external connection device according to claim 1, wherein a top of the housing assembly is provided with a positioning groove, and the antenna is at least partially mounted in the positioning groove.

8. The external connection device according to claim 1, wherein one of a top of the housing assembly and a bottom of the antenna is provided with a plurality of fixing columns, another one of the top of the housing assembly and the bottom of the antenna is provided with a plurality of fixing holes, and the plurality of fixing columns are inserted in the plurality of fixing holes in one-to-one correspondence.

9. The external connection device according to claim 8, wherein the one of the top of the housing assembly and the bottom of the antenna is provided with a circular protrusion, another one of the top of the housing assembly and the bottom of the antenna is provided with a circular groove, the circular protrusion is inserted into the circular groove, at least parts of the plurality of fixing columns are arranged at the circular protrusion, and at least parts of the plurality of fixing holes are arranged at a bottom of the circular groove.

10. An external connection device, comprising:

a ventilation mechanism, comprising a housing assembly and a fan arranged inside the housing assembly; wherein the housing assembly is provided with a first through hole and a second through hole, and the fan is connected with a fan cable extending out of the housing assembly from the first through hole; and an antenna, arranged on an outer wall of the housing assembly, wherein the antenna is connected with an antenna cable, and the antenna cable extends into the housing assembly from the second through hole and extends out of the housing assembly from the first through hole;

wherein the housing assembly is provided with an air inlet and an air outlet; the ventilation mechanism further comprises a first stage filtering unit and a second stage filtering unit, the first stage filtering unit is arranged inside the air inlet, and the second stage filtering unit is arranged inside the air outlet; and wherein the ventilation mechanism further comprises an air outlet grille, the air outlet grille is detachably covered onto the air outlet, and the second stage filtering unit is placed on the air outlet grille.

11. The external connection device according to claim 10, wherein a wall surface of the air outlet is provided with a circular baffle, and an edge of the second stage filtering unit is sandwiched between the circular baffle and the air outlet grille.

12. An external connection device, comprising:

a ventilation mechanism, comprising a housing assembly and a fan arranged inside the housing assembly; wherein the housing assembly is provided with a first through hole and a second through hole, and the fan is connected with a fan cable extending out of the housing assembly from the first through hole; and an antenna, arranged on an outer wall of the housing assembly, wherein the antenna is connected with an antenna cable, and the antenna cable extends into the housing assembly from the second through hole and extends out of the housing assembly from the first through hole;

wherein one of a top of the housing assembly and a bottom of the antenna is provided with a plurality of fixing columns, another one of the top of the housing assembly and the bottom of the antenna is provided with a plurality of fixing holes, and the plurality of fixing columns are inserted in the plurality of fixing holes in one-to-one correspondence.

* * * * *